Sept. 22, 1942.  H. C. FISCHER ET AL  2,296,782
PANEL COUPLING DEVICE
Filed April 25, 1942   2 Sheets-Sheet 1
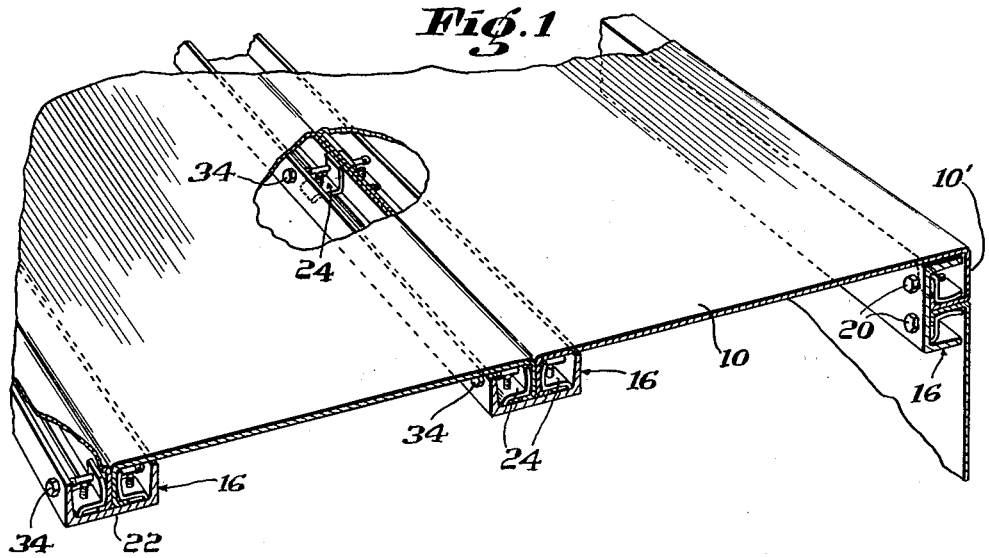
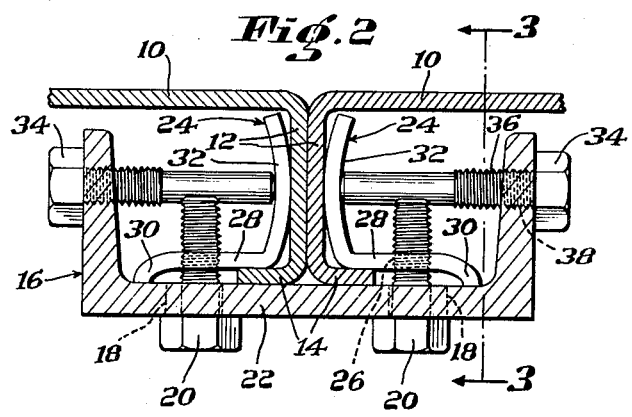
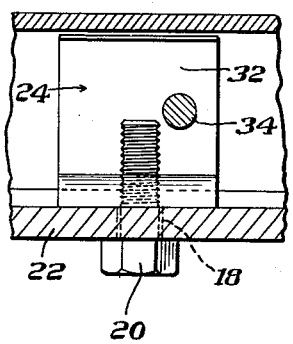
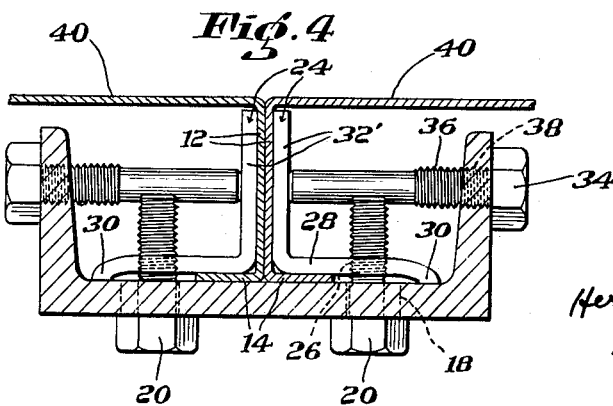
INVENTORS
Herbert C. Fischer and
Allan H. W. Higgins
BY H. F. Kirkpatrick
their ATTORNEY

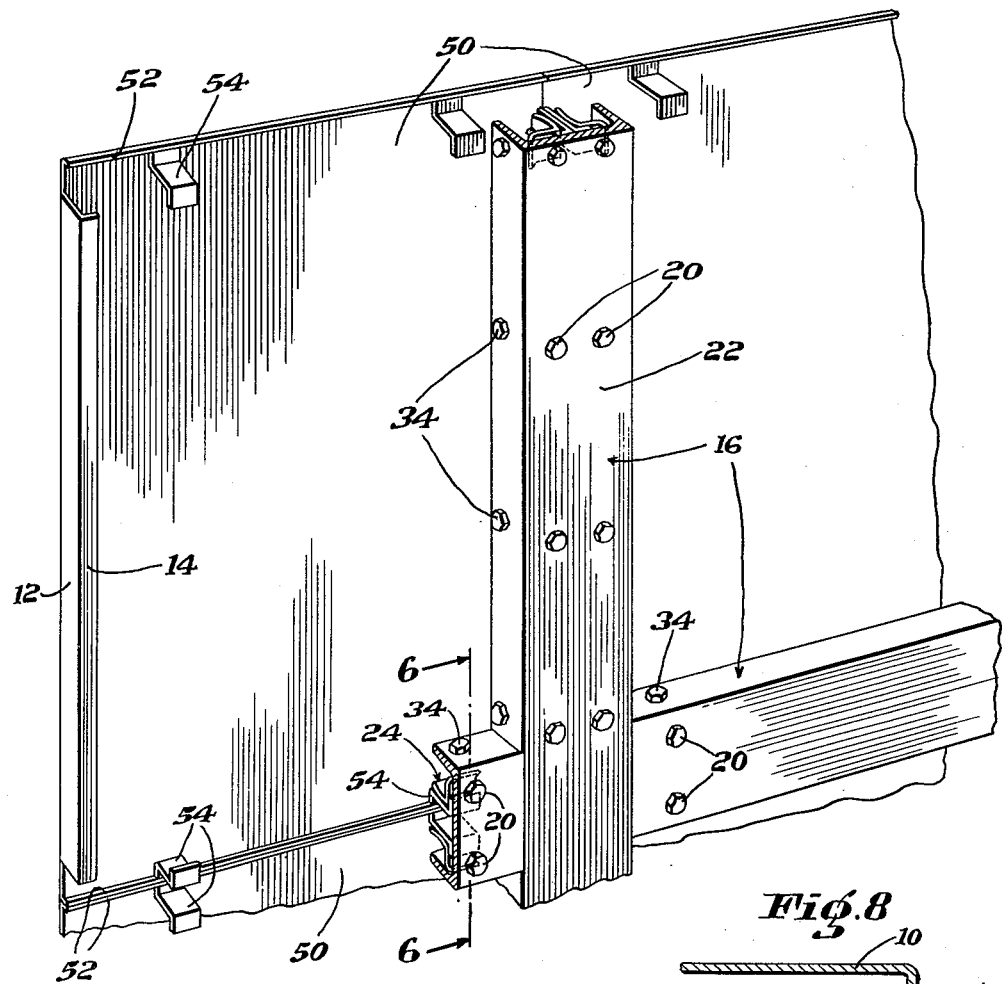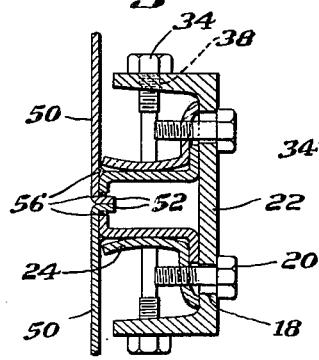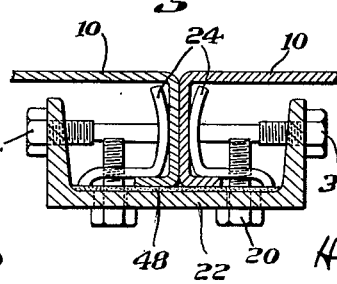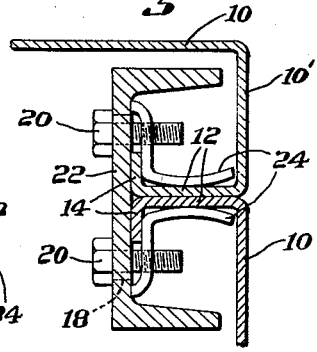

Patented Sept. 22, 1942

2,296,782

UNITED STATES PATENT OFFICE 2,296,782

PANEL COUPLING DEVICE

Herbert C. Fischer, Wellesley Hills, and Allan H. W. Higgins, Brookline, Mass.

Application April 25, 1942, Serial No. 440,492

6 Claims. (Cl. 189—34)

The present invention relates to devices for clamping panels together and for attaching the panels to supporting framework. The invention particularly concerns the joining and attaching of sheet metal panels in the fabrication of such articles as houses, bomb shelters, tanks, aeroplanes, etc.

The objects of the invention are to provide such a device which is inexpensive to manufacture and easy to apply; which does not require the use of rivet or bolt holes in the panels; which locks the panels tightly together and to supporting framework under substantial longitudinal tension or "skin stress"; and which does not weaken or loosen in use. These and other objects and advantages of the invention more fully appear in the ensuing particular description of preferred embodiments of the invention, illustrated in the accompanying drawings wherein:

Fig. 1 is a perspective view of portions of panels joined together by devices of the invention to form the corner of a structure, parts being broken away to show construction;

Fig. 2 is a vertical transverse section view of one of the joints shown in Fig. 1;

Fig. 3 is a vertical section view on the line 3—3 of Fig. 2;

Fig. 4 is a vertical section view similar to Fig. 2 of a modified structure;

Fig. 5 is a rear elevation view of a group of joined panels, showing further modification;

Fig. 6 is a section view on the line 6—6 of Fig. 5;

Fig. 7 is a detail section view of another modification;

Fig. 8 is a detail section view of the corner joint shown in Fig. 1.

Fig. 1 of the drawings shows one form of the invention applied to join together the sides of four metal panels 10, three of said panels being disposed in the same plane, with one panel having one edge 10' bent to form a corner and the fourth panel being disposed at right angles to said plane and joining said bent edge portion at the corner. As shown in said figure, and also in Fig. 2, said panels 10 forming one side of the structure have their adjacent sides reversely bent rearwardly from the plane of the panel to form L-shaped flanges having a leg 12 substantially normal to the plane of the panel and an inwardly directed leg 14 substantially parallel to the plane of the panel.

The co-planar panels 10 are joined together with their flange legs 12 abutting by means of lengths of channel iron 16 forming troughs in which the flanges are received and fastened. In most cases, the channel iron 16 will itself form the framework to which the panels are attached, the open end of the channel being directed outwardly, so that fastening of the panel flanges in said channel iron both joins the panels together and attaches them to the framework.

As shown in Figs. 2 and 3, the channel iron 16 is provided at suitable longitudinal intervals with a pair of bores 18 in the web or base 22 thereof, said bores being suited to receive therethrough the threaded shanks of a pair of bolts 20 having their heads disposed on the outer surface of the web. Preferably, as shown, these bores 18 are somewhat wider than the diameter of the shanks of bolts 20 forming, in effect, slots extending transversely of the web permitting lateral adjustment in the position of the bolts. The bores 18 are so located that the bolts are at opposite sides of the panel flange legs 14 when the panels are positioned with their flange legs 12 abutting in approximately the center of the trough of the channel iron 16.

Mounted upon each of the bolts is one of a pair of opposed, generally L-shaped, strap iron clamping lugs 24, each bolt shank being received through a co-operatively threaded aperture 26 in one leg 28 of the corresponding lug. Said leg 28 has one end 30 bent outwardly so that its end surface is substantially parallel to the rest of leg 28 and each lug is positioned with the end surface of this outwardly bent end 30 resting on the flat inner surface of the web 22 between the attachment bolt 20 and the adjacent channel iron flange. The extent of bending of the end or foot 30 is such as to offset its end surface from the plane of the rest of leg 28 an amount approximately equal to the thickness of the metal in panels 10 so that when the lug is positioned as in Fig. 2 with this end surface resting on the channel iron web, the opposite end portion of the leg 28 rests on the leg 14 of the panel flange. The other leg 32 of lugs 24 is disposed at substantially a right angle to the leg 28, and as shown in Fig. 2, leg 32 is bowed at its mid portion outwardly of the leg 28.

With the lugs 24 in clamping position as shown in Fig. 2, the outwardly bowed mid-section of leg 32 bears against leg 12 of the side flange of the corresponding panel 10 and is pressed tightly thereto by the end of a bolt 34 having a screw thread 36 on the opposite end of its stem which is received through a correspondingly threaded aperture 38 in the adjacent side flange of the channel iron. As shown in Fig. 3, the apertures 38 are, or may be, spaced a short distance longitudinally of the channel iron 16 from the corresponding bores 18 in the channel web. The bolts 34 are thus located to one side of the plane of bolts 20 so that bolts 34 do not present a limitation upon the length of bolts 20.

In making a joint as shown in Figs. 2 and 3, the lugs 24 are assembled on the bolts 20, the shanks of these bolts being threaded through the apertures 26 less than the full extent shown in Figs. 2 and 3 so that their foot 30 is loose against the web 22. Bolts 34 are also threaded through the apertures 38 less than the full extent shown in Fig. 2. The two panels 10 to be joined are then assembled with their flange legs 14 resting on the inner surface of the channel web 22 beneath the inner ends of the legs 28 of lugs 24 and with their flange legs 12 opposed. To facilitate this assembly, bolts 20 may be positioned at the outer ends of the bores 18 and the lugs 24 may be raised simply by pushing up on the heads of bolts 20 which are located on the outside of the channel iron 16. To complete the assembly it is merely necessary to tighten the bolts 20 and 34 at opposite sides of the abutting panel flanges.

When tightened, bolts 34 press the bowed mid-section of legs 32 of lugs 24 oppositely against flanges 12 forcing said flanges together into tight abutment. By thus tightening the bolts 34, lugs 24 will be moved inwardly drawing bolts 20 toward the inner ends of their bores or slots 18. By tightening of the bolts 20, legs 28 are drawn against panel flange legs 14, thus anchoring these legs firmly against the inner face of web 22.

It will thus be seen that with the device of the present invention, as represented in Figs. 1–3, joining and attaching of panels is made a very simple operation requiring as tools merely a wrench to tighten the bolts 20 and 34 which have their heads readily accessible on the outside of the channel iron 16. Legs 28 of lugs 24, by reason of the fact that they are unsupported between the feet 30 and their opposite ends which rest on flange legs 14, will bow slightly intermediate their ends when bolts 20 are fully tightened, thus exerting a spring-pressure upon the panel flange legs 14. This feature is important and highly desirable both because it provides a very firmly locked joint and because it tends to lock the bolt 20 against unloosening. The bowed surface of the other leg 32 of the lugs 24 also has a desirable tendency to force the panel flange legs 12 toward the web 22 as well as toward each other under the lateral pressure of the bolts 34. It should also be noted that the strain on bolts 20 and 34 is substantially entirely longitudinal and not lateral so that there is little likelihood of a joint becoming loose due to bending or shearing of the bolts.

In Fig. 4 of the drawings is shown a slightly modified form of the invention which is advantageous when joining panels of light gauge metal, such as the panels 40 indicated in said figure. In this instance all the parts are the same and, for the sake of simplicity, are designated by the same reference numerals, as those of Figs. 2 and 3 except the leg of the attachment lugs corresponding to the leg 32 of the embodiment of Figs. 2 and 3. In this case these legs, designated 32', are not bowed as in Figs. 2 and 3, and are pressed by the bolts 34 flush against the panel flange legs 12 for substantially the full length of said legs. Legs 32' thus reinforce and strengthen the legs 12, which support the panels, for their full length and prevent them from bending under inward pressures exerted on the panels which they would otherwise be incapable of supporting.

In cases where a panel forms a corner of the structure, it is usually desirable to have the joint between that panel and one of the adjacent side panels close to or directly behind the corner, as shown at the right hand end of Fig. 1 and in Fig. 8. In such case, the joint construction may be the same as that so far described except that the bolts 34 are omitted, as they would not be readily accessible along one side of the channel iron 16, the bolts 20 alone in this instance being relied on to clamp the lugs 24 in locking position.

In case it is desired to seal the joint completely against moisture penetration, this may be accomplished by providing a gasket on the inner surface of the web 22 underlying the abutted panel flanges. Such an arrangement is shown in Fig. 7, the gasket being indicated at 48. As shown, the gasket is co-extensive with the inner surface of the web 22 and is secured thereto, being provided with suitable apertures to register with the bores 18 in the web. The other parts of Fig. 7 are the same as those of Fig. 2 and for simplicity have been given the same reference numerals.

In Figs. 5 and 6 of the drawings there is illustrated a modified form of panel edge construction with which the invention may be utilized in cases where it is not desirable or feasible to bend the panel edges to be joined to form the flanges illustrated in the several figures heretofore discussed. In this instance, the panels, designated 50, have their extreme end edges turned at right angles to the plane of the panel to form a small lip 52. A pair of Z-shaped brackets 54 are fastened at one end to this lip and adjacent panel surface, as by welding indicated at 56 in Fig. 6. The opposite end of the brackets extends back over the panel so that each corresponds to a small section of the panel flanges shown in Fig. 1.

In joining the ends of these modified panels, their ends are abutted and a length of the channel iron 16 is inverted over them, the channel iron being provided with the apertures 18 and 38 so spaced as to be located opposite the brackets 54. One of the lugs 24, and the bolts 20 and 34, are applied as heretofore described. The pressure of bolt 34 on leg 32 of the lug urges the brackets 54 together at their attached ends, forcing the abutted ends of the panel tightly together. Leg 28 of the lug locks the outer end of the bracket to the channel iron under the action of bolt 20, thus effecting a tight joint between the panels.

The lip and bracket arrangement is shown only at the ends of the panels in Fig. 5, the sides being provided with inturned flanges having the legs 12 and 14 as in Fig. 1. However, either type of edge construction, or other suitable arrangements, may be used as desired.

Having described and illustrated herein preferred embodiments of our invention, what we desire to claim and secure by Letters Patent is:

1. In a device for clamping sections of sheet material having opposed marginal flanges, the combination of a channel member having a web portion and marginal flanges, a pair of clamping lugs in said channel member arranged to receive said opposed flanges therebetween, one of said lugs having a first leg substantially normal to the plane of said web portion and engageable with one of said opposed flanges, a second leg extending from said first leg substantially parallel to the plane of said web portion and a foot at the end of said second leg extending therefrom toward the plane of said web portion, and a bolt extending through said web portion and connected to said second leg of said one of said clamping lugs between said foot and said first leg thereof, said bolt holding said foot against said web portion and said first leg being under lateral pressure to clamp said opposed flanges against said other lug.

2. In a device for clamping sections of sheet material having opposed marginal flanges, the combination of a channel member having a web portion and marginal flanges, a pair of clamping lugs in said channel member arranged to receive said opposed flanges therebetween, one of said lugs having a first leg substantially normal to the plane of said web portion and engageable with one of said opposed flanges, a second leg extending from said first leg substantially parallel to the plane of said web portion and a foot at the end of said second leg extending therefrom toward the plane of said web portion, said first leg having its flange engaging surface bowed outwardly of said second leg at its mid-section, and a bolt extending through said web portion and connected to said second leg of said one of said clamping lugs between said foot and said first leg thereof, said bolt holding said foot against said web portion and said first leg being under lateral pressure to clamp said opposed flanges against said other lug.

3. In a device for clamping panel sections having opposed marginal flanges, the combination of a channel member having a web portion and marginal flanges, a pair of clamping lugs in said channel member arranged to receive said opposed flanges therebetween, one of said lugs having a first leg substantially normal to the plane of said web portion and engageable with one of said panel flanges, a second leg extending from said first leg substantially parallel to the plane of said web portion and a foot at the end of said second leg extending therefrom toward the plane of said web portion, an attaching bolt extending through said web portion and connected to said second leg of said one of said clamping lugs between said foot and said first leg thereof, said bolt effective on tightening to draw said foot against said web portion, and a second bolt extending through one of said channel member flanges and arranged to bear against said first leg of said one of said lugs, said second bolt effective on tightening to press said first leg laterally to clamp said panel flanges against said other lug.

4. In a device for clamping panel sections having opposed marginal flanges, the combination of a channel member having a web portion and marginal flanges, a pair of clamping lugs in said channel member arranged to receive said opposed flanges therebetween, one of said lugs having a first leg substantially normal to the plane of said web portion and engageable with one of said panel flanges, a second leg extending from said first leg substantially parallel to the plane of said web portion and a foot at the end of said second leg extending therefrom toward the plane of said web portion, an attaching bolt extending through said web portion and connected to said second leg of said one of said clamping lugs between said foot and said first leg thereof, said bolt effective on tightening to draw said foot against said web portion, and a second bolt extending through one of said channel member flanges and arranged to bear against said first leg of said one of said lugs, said second bolt effective on tightening to press said first leg laterally to clamp said panel flanges against said other lug, said second bolt being offset longitudinally of said channel member from said first bolt.

5. In a device for clamping panel sections having opposed marginal flanges, the combination of a channel member having a web portion and marginal flanges, a pair of clamping lugs in said channel member arranged to receive said opposed flanges therebetween, one of said lugs having a first leg substantially normal to the plane of said web portion and engageable with one of said panel flanges, a second leg extending from said first leg substantially parallel to the plane of said web portion and a foot at the end of said second leg extending therefrom toward the plane of said web portion, an attaching bolt extending loosely through said web portion and having a threaded stem received through a cooperatively threaded aperture in said second leg of said one of said clamping lugs between said foot and said first leg thereof, said bolt effective on tightening to draw said foot against said web portion, and a second bolt threaded through one of said channel member flanges and arranged to bear against said first leg of said one of said lugs, said second bolt effective on tightening to press said first leg laterally to clamp said panel flanges against said other lug.

6. In a device for clamping panel sections having opposed marginal flanges with in-turned edges, the combination of a channel member having a web portion and marginal flanges, a pair of clamping lugs in said channel member arranged to receive said opposed panel flanges therebetween with said in-turned edges of said panel flanges bearing against said web portion, one of said lugs having a first leg substantially normal to the plane of said web portion and engageable with one of said panel flanges, a second leg extending from said first leg substantially parallel to the plane of said web portion and a foot at the end of said second leg extending therefrom toward the plane of said web portion, and a bolt extending through said web portion and connected to said second leg of said one of said clamping lugs between said foot and said first leg, said bolt holding said foot against said web portion and the other end of said second leg against the in-turned edge of said one of said panel flanges, said first leg being under lateral pressure to clamp said panel flanges against said other lug.

HERBERT C. FISCHER.
ALLAN H. W. HIGGINS.